(12) United States Patent
Suzuki et al.

(10) Patent No.: US 7,762,559 B2
(45) Date of Patent: Jul. 27, 2010

(54) GASKET

(75) Inventors: Kiyohiro Suzuki, Tsukuba (JP); Manshu Kameike, Tsukuba (JP); Shuji Yoshitsune, Nihonmatsu (JP); Takashi Nakao, Nihonmatsu (JP)

(73) Assignee: NOK Corporation, Tokyo (JP)

( * ) Notice: Subject to any disclaimer, the term of this patent is extended or adjusted under 35 U.S.C. 154(b) by 444 days.

(21) Appl. No.: 11/918,996

(22) PCT Filed: Apr. 13, 2006

(86) PCT No.: PCT/JP2006/307805

§ 371 (c)(1),
(2), (4) Date: Oct. 19, 2007

(87) PCT Pub. No.: WO2006/115064

PCT Pub. Date: Nov. 2, 2006

(65) Prior Publication Data
US 2010/0044970 A1 Feb. 25, 2010

(51) Int. Cl.
*F16J 15/10* (2006.01)

(52) U.S. Cl. ........................ 277/627; 277/644; 277/651; 277/652; 277/654

(58) Field of Classification Search ................ 277/603, 277/626–627, 639, 644, 650, 651–652, 654, 277/591–592
See application file for complete search history.

(56) References Cited

U.S. PATENT DOCUMENTS

| | | | | |
|---|---|---|---|---|
| 3,775,832 A | * | 12/1973 | Werra | 29/450 |
| 3,918,726 A | * | 11/1975 | Kramer | 277/651 |
| 4,558,875 A | * | 12/1985 | Yamaji et al. | 277/312 |
| 5,326,138 A | * | 7/1994 | Claes et al. | 285/110 |
| 5,687,975 A | * | 11/1997 | Inciong | 277/591 |
| 6,237,966 B1 | * | 5/2001 | Kearns | 285/230 |
| 6,382,259 B1 | * | 5/2002 | Codling | 138/149 |
| 7,029,013 B2 | * | 4/2006 | Yajima et al. | 277/637 |
| 7,464,968 B2 | * | 12/2008 | Sakazaki et al. | 285/242 |

FOREIGN PATENT DOCUMENTS

| | | |
|---|---|---|
| JP | 53-7554 | 7/1978 |
| JP | 63-166760 | 10/1988 |
| JP | 10-009395 | 1/1998 |
| JP | 2001-004031 | 1/2001 |
| JP | 2002-021635 | 1/2002 |
| JP | 2002-071024 | 3/2002 |
| JP | 2002-24042 | 8/2002 |
| JP | 2003-269613 | 9/2003 |

* cited by examiner

*Primary Examiner*—Vishal Patel
(74) *Attorney, Agent, or Firm*—Brinks Hofer Gilson & Lione

(57) ABSTRACT

A gasket in an integrated double-layered structure comprising an outer layer and an inner layer enclosed by the outer layer, in which the outer layer is a low-hardness rubber layer having a JIS A hardness of 40-70, and the inner layer is a high-hardness rubber layer having a JIS A hardness of 80-100, where a ratio $h/h_0$ of height h of the inner layer to height $h_0$ of the outer layer is preferably 0.3-0.8, and ratio $d/d_0$ of height d of the inner layer to width $d_0$ of the outer layer is preferably 0.5-0.8 in the longitudal cross-section as view from the width direction of the gasket, has a low reaction force, and distinguished sealability and insertibility, and used as inserted between two members, one of which has a groove for insertion.

10 Claims, 3 Drawing Sheets

[Fig.1]
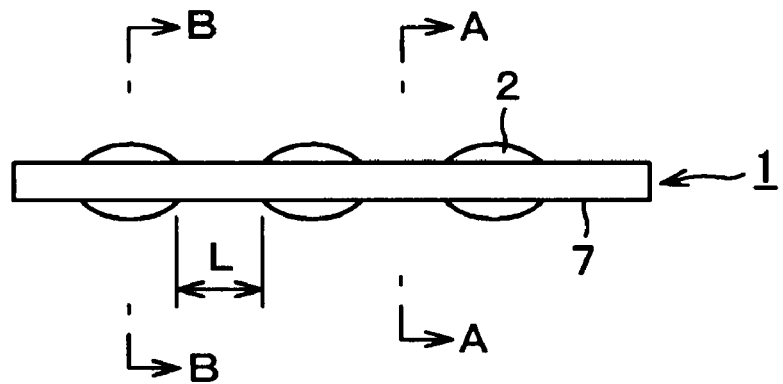
[Fig.2]
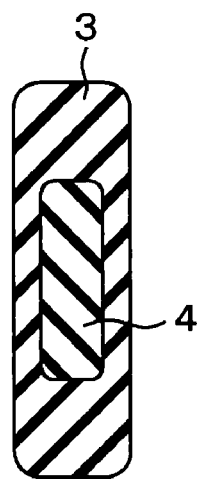
[Fig.3]
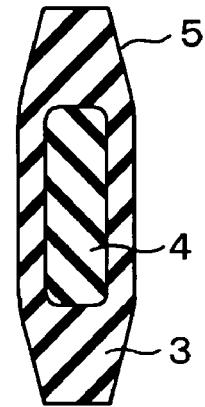

[Fig.4]
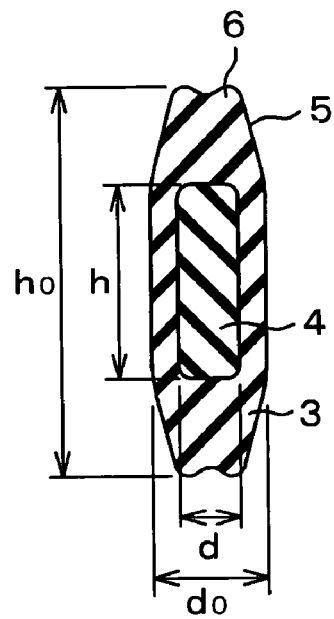
[Fig.5]
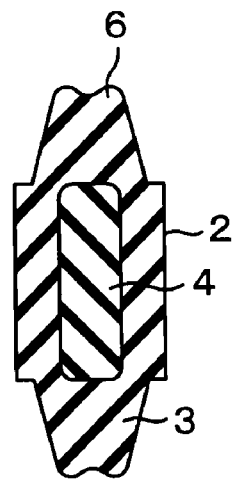

[Fig.6]
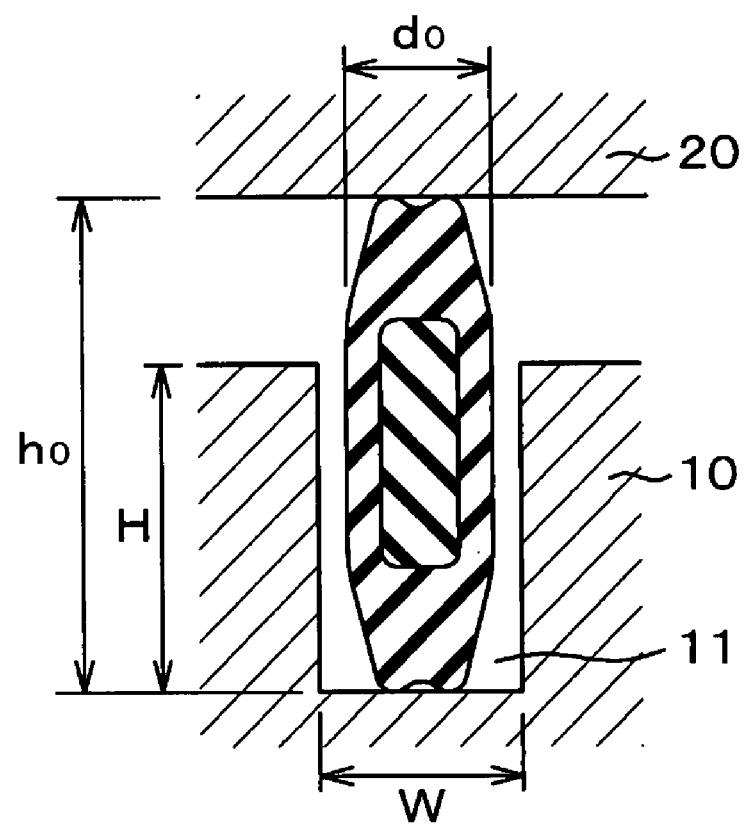

GASKET

RELATED APPLICATION

This application is a 35 U.S.C. §371 national stage filing of International Patent Application No. PCT/JP2006/307805, filed Apr. 13, 2006, to which priority is claimed under 35 U.S.C. §120 and through which and to which priority is claimed to Japanese Priority Patent Application No. 2005-124518, filed Apr. 22, 2005.

TECHNICAL FIELD

The present invention relates to a gasket, and more particularly to a gasket with a low reaction force, and distinguished sealability and insertibility.

BACKGROUND ART

Relatively large types of gaskets are used for the inlet manifolds, filter blankets, cylinder head covers, etc. of automobile engines by inserting the gaskets between two members, one of which has a groove for insertion to effect tight sealing therebetween. To meet the recent trend for making the engine weight lighter, the engine members are now made from resins or aluminum, and consequently the rigidity of members becomes lower. Thus, the gaskets of a lower reaction force are now desired. Gaskets in a shape of larger longitudinal cross-section as viewed from the width direction of the gasket (a shape of larger cross-sectional height with respect to the cross-sectional width) have been generally used.

Patent Literature 1: JP-A-2003-269613
Patent Literature 2: JP-A-2002-21635

It is desirable for making gaskets having a lower reaction force to use rubber materials of low hardness, but in the case of inserting such gaskets of relatively large type, in a shape of larger longitudinal cross-section as viewed from the width direction, and made of materials of low hardness, into grooves in engine members having various complicated shapes, the gaskets are easily susceptible to torsion in the insertion working, lowering the working efficiency, or the inserted gaskets undergo partial flexure or elongation, making it hard to conduct uniform insertion, and consequently often causing leakage at the time of compression tight sealing or compression cracking of gaskets.

In this connection, it has been proposed to provide a gasket with a frame to enable automatic insertion, specifically a cover gasket to be inserted between a cover member and a fixing member, provided with a projection protruded from the outer side surface of elastic body of the cover gasket into a thicker shape towards the tip end of the projection, and also provided with a reinforcing rod coming out from the outer side surface of the cover gasket to enclose the projection, or a gasket comprising an insert material with a raised part, and a seal member, as inserted into a gasket insertion position of a cover member with a vertically suspended-down, exertion part, thereby ensuring exertion of a precise surface pressure, enhancing a tight sealing performance and keeping a better shape to enable mechanically automatic fixing.

Patent Literature 3: JP-A-2000-130591
Patent Literature 4: JP-A-2002-243042

In such structures, however, the frame must be molded to meet the desired dimensions of fixing member in advance, and a gasket must be integrally molded to match up with the frame, making the production process complicated. In the case of a gasket in a three-dimensional shape, as shown in FIG. 1 of the following Patent Literature 5, integral molding of the gasket to match up with the frame is a difficult problem.

Patent Literature 5: JP-A-2002-71024

On the other hand, it has been also proposed to embed a rigid core body into a gasket body as an ordinary method for improving the working efficiency of gaskets, more specifically, a gasket made by integration of a core body with an elastic material, where the entire peripheral surface of the core body formed into a frame shape of most thereof is coated with the elastic material. In that case, molding of the core boy in advance is a complicated problem and an exact placement of the core body at a predetermined position of the gasket cross-section, for example, at a center portion, at the time of molding, is also a difficult problem. Furthermore, a gasket provided with a core body of high rigidity, such as metals, resins, etc. has a problem that the gasket itself has a higher reaction force, and also such further problems that a high shearing stress arises at the boundary surface between the rubber material and the core body, causing peeling to take place at the boundary surface therebetween.

Patent Literature 6: JP-A-2001-4031

DISCLOSURE OF THE INVENTION

Problem to be Solved by the Invention

An object of the present invention is to provide a gasket for use as inserted between two part members, one of which has a groove for insertion, which has a low reaction force, and distinguished sealability and insertibility.

Means for Solving the Problem

The object of the present invention can be attained a gasket in an integrated double-layered structure, which comprises an outer layer and an inner layer enclosed by the outer layer, where the outer layer is a low-hardness rubber layer having a JIS A hardness of 40-70, and the inner layer is a high-hardness rubber layer having a JIS A hardness of 80-100. The JIS A hardness means a hardness determined by a Durometer type A hardness tester according to JIS K6253 (corresponding to ISO 7619).

Effect of the Invention

The present gasket has a low reaction force, a distinguished sealability and both bending rigidity and torsion rigidity in such degrees as to attain a satisfactory effect on insertibility. That is, the bending rigidity and torsion rigidity of the entire gasket can be improved by making the inner layer from rubber of high-hardness, thereby improving the insertibility of the gasket into a housing groove. At the same time, the sealability can be ensured by making the outer layer from rubber of low-hardness. In other words, the outer layer of low rubber hardness and the inner layer of higher rubber hardness make the compressibility of the rubber layer of the outer layer partially higher, when compressed, thereby ensuring exertion of the necessary surface pressure. That is, the present gasket comprising two rubber layers can undergo sealing at a low compressibility, as compared with the conventional gasket consisting of a single rubber layer. Furthermore, the conventional gasket consisting of a single layer has such problems as falling-down, etc., when compressed, whereas the present gasket can be prevented from abnormal falling-down, buckling, etc. of the gasket by the presence of an inner high-hardness rubber layer.

Particularly, in the longitudinal cross-section as viewed from the width direction of a gasket, a gasket having a ratio $h/h_o$ of the height h of an inner layer to the height $h_o$ of an outer layer of 0.3-0.8, and a ratio $d/d_o$ of the width d of an inner layer to the width $d_o$ of an outer layer of 0.5-0.8 has a low reaction force and distinguished insertibility and sealability. That is, a distortion at the boundary surface between the inner layer and the outer layer will be smaller, when compressed, by setting the hardness, dimension and shape of the outer and inner rubber layer to values in specific ranges, thereby suppressing peeling at the boundary surface and also suppressing a considerable increase in the reaction force. That is, the compression cracking of a gasket can be suppressed. Furthermore, the present gasket is also so distinguishable in the moldability that the molding can be carried out easily and precisely.

BRIEF DESCRIPTION OF DRAWINGS

[FIG. 1] is a front view of one embodiment of the present gasket.
[FIG. 2] is a cross-sectional view along the line A-A of FIG. 1.
[FIG. 3] is a cross-sectional view of another embodiment along the line A-A of FIG. 1.
[FIG. 4] is a cross-sectional view of further another embodiment along the line A-A of FIG. 1
[FIG. 5] is a cross-sectional view along the line B-B of FIG. 1.
[FIG. 6] is a cross-sectional view showing a state of a gasket having a cross-section shown in FIG. 4 as inserted between two part members.

DESCRIPTION OF REFERENCE NUMERALS

1 Gasket
2 Projection
3 Outer layer
4 Inner layer
5 Tapered surface
6 Sealing projection
7 Side surface
10 First housing
11 Fixing groove
20 Second housing

BEST MODES FOR CARRYING OUT THE INVENTION

In the present gasket in an integrated double-layered structure comprising an outer layer and an inner layer, the outer layer is a low-hardness rubber layer having a JIS A hardness of 40-70, preferably 50-60. When the hardness is above 70, the gasket fails to undergo insufficient tight sealing on the surfaces of members between which the gasket is to be inserted, and a desired sealability can be no more obtained, whereas when the hardness is below 40, such features of low-hardness rubber material that the compression set value is generally high will come out straight, deteriorating a seal durability when compressed.

On the other hand, the inner layer to be enclosed as a core body by the outer layer is a high-hardness rubber layer having a JIS A hardness of 80-100, preferably 85-95. When the hardness is above 100, there is such a problem that a distortion will be so larger at the boundary surface between the inner layer and the outer layer that peeling will take place therebetween, whereas when the hardness is below 80, the bending rigidity and the torsion rigidity of the entire gasket will be too low to obtain satisfactory insertibility.

Hardness of rubber used in the outer layer and the inner layer can be adjusted by changing amounts of reinforcing agents to be filled therein, such as carbon black, etc.

The present gasket in a reverse structure, that is, a gasket comprising an inner layer of low-hardness rubber and an outer layer of high-hardness rubber, can have an improved effect on the insertibility, but has a tight sealing problem on the sealed surfaces or a reaction force problem, so the desired object as aimed at in the present invention cannot be attained.

Rubber layers for the inner and outer layers can be formed from vulcanized rubber such as acrylic rubber, nitrile rubber, hydrogenated nitrile rubber, fluoro rubber, etc. or moldings of thermoplastic elastomers. The gasket in a double-layered structure can be prepared by molding an inner high-hardness rubber layer in advance, followed by molding an outer layer on the surface of the inner layer to enclose the inner layer, but an integrated molding method by simultaneous extrusion molding or injection molding of two kinds of rubber materials is preferable from the viewpoint of process simplicity. Vulcanization of rubber materials can be carried out by the ordinary process for conducting molding and vulcanization including the secondary vulcanization at the same time. It is also possible to prepare a molding in a double-layered structure and in a gasket shape before complete vulcanization, and then conduct complete vulcanization in that state to obtain a gasket in a precise shape as desired.

The gasket can have any desired shape, for example, sheet gaskets having a square shape, a rectangular shape, a disc shape or annular gaskets having an O-ring shape, a square ring shape, etc. FIG. 1 is a front view showing an annular gasket 1 provided with projections 2 for preventing falling-down. Cross-sectional views along the line A-A, showing various embodiments of gaskets comprising an outer layer 3 and an inner layer 4 as integrated are given in FIGS. 2 to 4, and a cross-sectional view along the line B-B is given in FIG. 5. The projections 2 for preventing falling-down can be provided, if required. The state of gasket 1 inserted between an insertion groove 11 of primary housing 10 and secondary housing 20 is shown in FIG. 6.

Various gaskets for engines as given above are designed to have generally such dimensions as the height is about 5 to about 20 mm, and the width is about 1.5 to about 6 mm in the longitudinal cross-section as viewed from the width direction of the gasket. As shown in FIG. 4, a ratio $h/h_0$ of height h of the inner layer to height $h_0$ of the outer layer of the gasket is set to a range of 0.3-0.8, preferably 0.5-0.75. When the height ratio $h/h_0$ is below 0.3, the bending rigidity and torsion rigidity of the entire gasket will be lowered, and the gasket fixability will not be improved. On the other hand, when the ratio is above 0.8, the distortion of low-hardness rubber layer will be larger, so there will be a possibility of compression cracking.

A ratio $d/d_0$ of width d of the inner layer to width $d_0$ of the outer layer is set to a range of 0.5-0.8, preferably 0.6-0.8. When the width ratio of $d/d_0$ is below 0.5, the bending rigidity and torsion rigidity of the entire gasket will be lowered, and the gasket fixability will not be improved. On the other hand, when the ratio is above 0.8, the inner layer will be easily protrudes from the side surface outwardly to expose the boundary surface between the inner layer and the outer layer to the outside. In the case of exposing the boundary surface between the inner layer and the outer layer to the outside, a fluid to be sealed will penetrate into the boundary surface with a high possibility to promote occurrence of peeling between the inner layer and the outer layer.

It is preferable to arrange the inner layer in a symmetrical position to the center part of the outer layer, and if deviated from the center part or arranged asymmetrically, the gasket fails to undergo symmetrical deformation, when compressed, causing it to undergo buckling or falling-down. It is preferable that the corners of the inner layer have some curvature, because the distortion with respect to the outer layer will be relieved when compressed.

FIG. 2 is a cross-sectional view along the line A-A of FIG. 1, where the outer layer 4 and the inner layer 3 are arranged so that their center liners are aligned to be identical to each other. FIG. 3 is a cross-sectional view in a different cross-sectional shape from that of FIG. 2, along the line A-A of FIG. 1, where the outer layer 3 is molded to have tapered surfaces 5 at both edges of the inner layer 4. Tapered surfaces 5 so formed ensure exertion of a higher surface pressure than that of simple rectangular cross-section. FIG. 4 is a cross-sectional view in a further different cross-section form that of FIG. 3, along the line A-A of FIG. 1, where the outer layer 3 is molded to have not only the tapered surfaces 5, but also sealing projections 6 on seal surfaces. Sealing projections 6 as formed assure exertion of a much higher surface pressure.

FIG. 5 is a cross-sectional view along the line B-B of FIG. 1. In the embodiment shown in FIG. 1, a plurality of pairs of projections 2 in and arc shape, a trapezoidal shape, etc. are formed at a predetermined distance L, as protruded from both side surfaces 7 of the annular body of annular gasket 1. The projections ensure compression joining to improve tight sealing function of seal surfaces.

Patent Literature 7: JP-A-10-9395

FIG. 6 is a cross-sectional view showing an insertion state along the line A-A of FIG. 1, where gasket 1 is fixed in fixing groove 11 drilled in first housing 10, and sealing is attained between the groove bottom surface of the fixing groove and the surface of second housing 20 to ensure tight sealing. In that case, the height $h_0$ of the outer layer is made higher than the height H of fixing groove 11 and the width $d_0$ of the outer layer is made smaller than the width W of fixing groove 11.

Gaskets to be fixed between two members, one of which is provided with a fixing groove, include, for example, not only gasket for the afore-mentioned various engines, but also gaskets for fuel cell separators requiring both low reaction force and high insertibility at the same time, etc.

EXAMPLES

The present invention will be described in detail below, referring to Examples.

Example 1

Integrated rubber gaskets in a cross-sectional shape as shown in FIG. 4, in which the outer layer was made from a low-hardness acrylic rubber having a JIS A hardness of 60, the inner layer was made from a high-hardness nitrile rubber having a JIS A hardness of 90, and the peripheral length of the annular body was set to 1 m, the height $h_0$ of the outer layer to 8.2 mm, the width $d_0$ of the outer layer to 2.3 mm, the height h of the inner layer to various height ratios $h/h_0$, the width d of the inner layer to a width ratios $d/d_0$ of 0.63, the radius of curvatures at the corners of the inner layer to 0.5 mm, the distance between the sealing projections to 0.8 mm, and the taper inclination to 13°, were compressed at a compressibility of 0.25 in the longitudinal direction to determine various characteristics.

Such various characteristics as reaction force, bending rigidity, torsion rigidity, maximum principal distortion at the boundary surface between the inner layer and the outer layer, maximum principal distortion, insertibility, and sealability were determined, where the maximum principle distortion ("the maximum principal distortion" means a distortion at the position of occurrence of the largest compression distortion among distortions distributed partially throughout the gasket cross-section, when the gasket was inserted and compressed and "the maximum principal distortion at the boundary surface" means a distortion at the position of occurrence of the largest distortion at the boundary surface between the inner layer and the outer layer when the gasket was thus compressed) were determined by FEM analysis; the insertibility was evaluated by mark "◯" for the case where no torsion occurred and neither flexure nor elongation took place in the groove when a gasket was inserted, by mark "Δ" for the case where some torsion occurred, but neither flexure nor elongation took place when a gasket was inserted into the groove, and by mark "X" for the case where the torsion, and flexure and elongation took place ; and the sealability was determined by a leak test (applying a predetermined pressure to a tightly sealed vessel, to which a gasket was set, to evaluate occurrence of leakage by changing pressure with time) and evaluated by mark "◯" for the case where no leakage was observed at all, and by mark "X" for the case where substantial leakage was observed.

The results are shown in the following Table 1.

TABLE 1

| Items of determination·evaluation | Height ratio: $h/h_0$ | | | | | |
|---|---|---|---|---|---|---|
| | 0 | 0.38 | 0.50 | 0.63 | 0.75 | 1.00 |
| Reaction force (N/mm) | 3.6 | 3.9 | 4.1 | 4.2 | 4.4 | 5.1 |
| Bending rigidity (Nmm²) | 24 | 42 | 49 | 55 | 62 | 183 |
| Torsion rigidity (Nmm²) | 332 | 429 | 550 | 750 | 1044 | 2487 |
| Max. principal distortion at boundary surface (—) | — | 0.33 | 0.37 | 0.39 | 0.44 | — |
| Max. principal distortion (—) | 0.64 | 0.61 | 0.63 | 0.68 | 0.72 | 0.64 |
| Insertibility | X | Δ | ◯ | ◯ | ◯ | ◯ |
| Sealability | ◯ | ◯ | ◯ | ◯ | ◯ | X |

Example 2

In Example 1, the height ratio $h/h_0$ was set to 0.63, and the width ratio $d/d_0$ was set to various ratios. Results shown in the following. Table 2 were obtained.

TABLE 2

| Items of determination-evaluation | Width ratio $d/d_0$ | | | |
|---|---|---|---|---|
| | 0.43 | 0.50 | 0.63 | 0.75 |
| Reaction force (N/mm) | 4.1 | 4.1 | 4.2 | 4.3 |
| Bending rigidity (Nmm$^2$) | 35 | 40 | 55 | 79 |
| Torsion rigidity (Nmm$^2$) | 599 | 650 | 750 | 858 |
| Max. principal distortion at boundary surface (—) | 0.41 | 0.41 | 0.39 | 0.37 |
| Max. principal distortion (—) | 0.64 | 0.68 | 0.68 | 0.68 |
| Insertibility | Δ | Δ | ○ | ○ |
| Sealability | ○ | ○ | ○ | ○ |

Comparative Example 1

In Example 1, the inner layer was made from thermosetting resin having a Young's modulus of 3 GPa and the height ratio $h/h_0$ was set to 0.63. The resulting composite rubber-resin gasket was subjected to the same determination as in Example 1.

Comparative Example 2

Example 1, the rubber materials were interchanged between the outer layer and the inner layer and the height ratio $h/h_0$ was set to 0.63. The resulting composite rubber gasket was subjected to the same determination as in Example 1.

The results are shown in the following Table 3.

TABLE 3

| Item of determination-evaluation | Comp. Ex. 1 | Comp. Ex. 2 |
|---|---|---|
| Reaction force (N/mm) | 16.3 | 4.3 |
| Bending rigidity (Nmm$^2$) | 3605 | 152 |
| Torsion rigidity (Nmm$^2$) | 48574 | 2069 |
| Max. principal distortion at boundary surface (—) | 2.62 | 0.36 |
| Max. principal distortion (—) | 3.50 | 0.56 |
| Insertibility | ○ | ○ |
| Sealability | ○ | X |

It can be concluded from the foregoing results that:
(1) The present gasket has a low reaction force and a good sealability and also has so effective degree of bending rigidity and torsion rigidity for insertibility. Particularly, a gasket having a height ratio $h/h_0$ of 0.5-0.75 and a width ratio $d/d_0$ of 0.6-0.8 of the inner layer and the outer layer has distinguished reaction force, insertibility and sealability.
(2) A gasket of single low-hardness rubber having a JIS A hardness of 60 ($h/h_0=0$) has a low reaction force and a distinguished sealability, but the bending rigidity and torsion rigidity are low together with a poor insertion workability. On the other hard, a gasket of single high-hardness rubber having a JIS A hardness of 90 ($h/h_0=100$) is not preferable in respect to the reaction force and sealability.
(3) A gasket comprising an inner layer of resin has high bending rigidity and torsion rigidity, and a distinguished insertibility, but has a problem in reaction force, and furthermore has a problem in peeling because of a larger maximum principal distortion at the boundary surface between the inner layer and the outer layer. Still furthermore, there is a possibility of compression cracking due to a larger maximum principal distortion.
(4) A gasket comprising an outer layer of high-hardness rubber and an inner layer of low-hardness rubber has distinguished bending rigidity and torsion rigidity and also has a distinguished insertibility, but is not preferable in respect to the sealability.

The invention claimed is:
1. A gasket in an integrated double-layered comprising an outer layer and an inner layer enclosed by the outer layer, in which the outer layer is a low-hardness rubber layer having a JIS A hardness of 40-70, and the inner layer is a high-hardness rubber layer having a JIS A hardness of 80-100, wherein the gasket has a ratio $h/h_o$ of height h of the inner layer to height $h_o$ of the outer layer which is 0.3-0.8, and a ratio $d/d_o$ of width d of the inner layer to width $d_o$ of the outer layer which is 0.5-0.8 in the longitudinal cross-section as viewed from the width direction of the gasket.

2. A gasket according to claim 1, wherein the inner layer is arranged symmetrically to the center part of the outer layer.

3. A gasket according to claim 1, wherein the inner layer has corners having a curvature.

4. A gasket according to claim 1, wherein the outer layer at both ends of the inner layer has tapered surfaces.

5. A gasket according to claim 4, wherein the outer layer has sealing projections at sealing surface.

6. A gasket according to claim 1, wherein the gasket has a plurality of pairs of projections formed on the side surfaces of the annular body of the annular gasket.

7. A gasket according to claim 6, wherein the projections as in an arc shape or trapezoidal shape.

8. A gasket according to claim 1, wherein the height $h_o$ and the width $d_o$ of the outer layer are set to 5-20 mm, and 1.5-6 mm, respectively, in the longitudinal cross-section as viewed from the width direction of the gasket.

9. A gasket according to claim 1, for use as inserted between two members, one of which has an groove for insertion.

10. A gasket according to claim 9, wherein the gasket for use as inserted between two members, one of which has a groove for insertion, is for use in inlet manifolds, filter blankets, and cylinder head covers of automobile engines, or in separators of fuel cells.

* * * * *

UNITED STATES PATENT AND TRADEMARK OFFICE
CERTIFICATE OF CORRECTION

| | | |
|---|---|---|
| PATENT NO. | : 7,762,559 B2 | Page 1 of 1 |
| APPLICATION NO. | : 11/918996 | |
| DATED | : July 27, 2010 | |
| INVENTOR(S) | : Kiyohiro Suzuki et al. | |

It is certified that error appears in the above-identified patent and that said Letters Patent is hereby corrected as shown below:

On the Title Page

The foreign application priority information has been omitted and should be added as:

Item --(30) Foreign Application Priority Data

April 22, 2005   (JP) ........ 2005-124518--

Signed and Sealed this
Ninth Day of August, 2011

David J. Kappos
*Director of the United States Patent and Trademark Office*